US012208330B2

(12) United States Patent
Tago et al.

(10) Patent No.: US 12,208,330 B2
(45) Date of Patent: Jan. 28, 2025

(54) INFORMATION PROCESSING PROGRAM, INFORMATION PROCESSING METHOD, AND INFORMATION PROCESSING DEVICE FOR AVOIDANCE OPERATIONS BASED ON DIFFERENT ATTACKS

(71) Applicant: CYGAMES, INC., Tokyo (JP)

(72) Inventors: Junji Tago, Tokyo (JP); Kazuki Yanashima, Tokyo (JP)

(73) Assignee: CYGAMES, INC., Tokyo (JP)

( * ) Notice: Subject to any disclaimer, the term of this patent is extended or adjusted under 35 U.S.C. 154(b) by 542 days.

(21) Appl. No.: 17/386,495

(22) Filed: Jul. 27, 2021

(65) Prior Publication Data
US 2022/0001282 A1      Jan. 6, 2022

Related U.S. Application Data

(63) Continuation of application No. PCT/JP2020/002480, filed on Jan. 24, 2020.

(30) Foreign Application Priority Data

Jan. 31, 2019   (JP) ................................. 2019-015215

(51) Int. Cl.
*A63F 13/56*     (2014.01)
*A63F 13/52*     (2014.01)

(52) U.S. Cl.
CPC .............. *A63F 13/56* (2014.09); *A63F 13/52* (2014.09)

(58) Field of Classification Search
CPC .......... A63F 13/56; A63F 13/52; A63F 13/44; A63F 13/822
See application file for complete search history.

(56) References Cited

U.S. PATENT DOCUMENTS 6,267,674 B1 *   7/2001   Kondo .................... A63F 13/10
                                                      463/32
6,283,854 B1 *   9/2001   Niwa ...................... A63F 13/45
                                                      463/7

(Continued)

FOREIGN PATENT DOCUMENTS

JP              6018269 B2      11/2016

OTHER PUBLICATIONS

International Search Report issued in PCT/JP2020/002480 on Apr. 7, 2020 (2 pages).

(Continued)

*Primary Examiner* — Chase E Leichliter
(74) *Attorney, Agent, or Firm* — Osha Bergman Watanabe & Burton LLP

(57) ABSTRACT

A sense of strangeness that is given by an avoiding action is alleviated. An information processing program realizes, with a computer: an avoiding-action execution function for causing a first character to execute an avoiding action on the basis of the input of an avoiding operation by a player; a determination function for determining whether or not a predetermined condition is satisfied in the case where an avoiding operation has been input by the player; and a special-attack execution function for causing a second character to execute a special attack, which is an attack that targets the first character and that results in a failure, in the case where it is determined by the determination function that the predetermined condition is satisfied.

10 Claims, 6 Drawing Sheets

(56) References Cited

U.S. PATENT DOCUMENTS

| | | | | |
|---|---|---|---|---|
| 6,358,148 B1* | 3/2002 | Tanaka | ............... | A63F 13/822 |
| | | | | 463/43 |
| 6,582,308 B1* | 6/2003 | Yamajiri | ............... | A63F 13/45 |
| | | | | 463/31 |
| 6,645,076 B1* | 11/2003 | Sugai | ............... | A63F 13/58 |
| | | | | 463/36 |
| 2002/0119811 A1* | 8/2002 | Yabe | ............... | A63F 13/45 |
| | | | | 463/8 |
| 2002/0187837 A1* | 12/2002 | Hasebe | ............... | A63F 13/52 |
| | | | | 463/43 |
| 2003/0038428 A1* | 2/2003 | Yotoriyama | ............ | A63F 13/45 |
| | | | | 273/440 |
| 2004/0259636 A1* | 12/2004 | Machida | ............... | A63F 13/10 |
| | | | | 463/30 |
| 2005/0107145 A1* | 5/2005 | Karashima | ............. | A63F 13/45 |
| | | | | 463/8 |
| 2005/0221879 A1* | 10/2005 | Tsuchiya | ............... | A63F 13/58 |
| | | | | 463/8 |
| 2006/0068905 A1* | 3/2006 | Umezaki | ............... | A63F 13/69 |
| | | | | 463/31 |
| 2007/0265045 A1* | 11/2007 | Takai | ............... | A63F 13/822 |
| | | | | 463/8 |
| 2008/0008354 A1* | 1/2008 | Milbert | ............... | F41G 3/16 |
| | | | | 382/103 |
| 2009/0042629 A1* | 2/2009 | Yamashita | ............. | A63F 13/10 |
| | | | | 463/9 |
| 2013/0109472 A1* | 5/2013 | Tabata | ............... | A63F 13/40 |
| | | | | 463/31 |
| 2014/0274401 A1* | 9/2014 | Oono | ............... | A63F 13/49 |
| | | | | 463/40 |
| 2018/0021672 A1* | 1/2018 | Baba | ............... | A63F 13/54 |
| | | | | 463/31 |
| 2018/0050265 A1* | 2/2018 | Wada | ............... | A63F 13/214 |
| 2018/0178126 A1* | 6/2018 | Takahashi | ............. | A63F 13/95 |
| 2018/0200616 A1* | 7/2018 | Li | ............... | A63F 13/214 |
| 2019/0262714 A1* | 8/2019 | Tokuda | ............... | A63F 13/67 |
| 2022/0001282 A1* | 1/2022 | Tago | ............... | A63F 13/822 |

OTHER PUBLICATIONS

Written Opinion of the International Searching Authority issued in PCT/JP2020/002480 on Apr. 7, 2020 (4 pages).

Notice of Reasons for Rejection issued to JP Application No. 2019-015215, mailed Apr. 16, 2019 (7 pages).

Notice of Reasons for Rejection issued to JP Application No. 2019-015215, mailed Aug. 13, 2019 (7 pages).

[White cat strategy] "First, let's learn the basics of battle! I will explain how to move the character and how to avoid attacks, etc.", [online], Aug. 12, 2014, [retrieval date Apr. 2, 2019], Internet:<URL: https://www.appps.jp/115523>, in particu lar, see section (6 pages).

[White cat strategy] "Avoidance techniques in battle", [online], Aug. 30, 2014, [retrieval date Apr. 3, 2019]? Internet: <URL:https://app.famitsu.com/20140830_431111/> (9 pages).

"Dragon Quest 11 (DQI 1) Manusa's effect and friends to remember" (3 pages).

* cited by examiner

INFORMATION PROCESSING PROGRAM, INFORMATION PROCESSING METHOD, AND INFORMATION PROCESSING DEVICE FOR AVOIDANCE OPERATIONS BASED ON DIFFERENT ATTACKS

TECHNICAL FIELD

The present invention relates to information processing programs, information processing methods, and information processing devices.

BACKGROUND ART

There is a type of computer game in which a character that is operated by a player (hereinafter referred to as an "ally character") and a character that is in opposition to the ally character (hereinafter referred to as an "enemy character") mutually perform attacks.

In this type of game, the ally character is caused to execute an avoiding action on the basis of a predetermined operation by the player, whereby an attack by the enemy character is avoided (e.g., see paragraph [0072] in the description of Patent Literature 1).

By making it possible to perform such an avoiding action, it is possible to expand the variety of operations by the player, thereby enhancing the attraction of the game.

PTL 1: Publication of Japanese Patent No. 6018269

DISCLOSURE OF THE INVENTION

Problems to be Solved by the Invention

Here, regarding the avoiding action described above, it is assumed that the player performs a predetermined operation upon anticipating or recognizing an attack by the enemy character and that the avoiding action is executed accordingly. Depending on the player, however, there are cases where, as a result of placing too much emphasis on avoiding attacks by the enemy character, the predetermined operation is performed without anticipating or recognizing any attack by the enemy character. For example, there are cases where the predetermined operation is performed successively irrespective of whether or not an attack is performed by the enemy character.

In this case, the ally character performs the avoiding action irrespective of whether or not an attack is performed by the enemy character. This causes the player or viewers of the game to perceive a sense of strangeness, such as unnaturalness or a lack of reality.

The present invention has been made in view of the situation described above, and it is an object thereof to alleviate a sense of strangeness that is given by an avoiding action.

Means for Solving the Problems

In order to achieve the object described above, an information processing program according to an aspect of the present invention realizes, with a computer:

an avoiding-action execution function for causing a first character to execute an avoiding action on the basis of the input of an avoiding operation by a player;
a determination function for determining whether or not a predetermined condition is satisfied in the case where an avoiding operation has been input by the player; and
a special-attack execution function for causing a second character to execute a special attack, which is an attack that targets the first character and that results in a failure, in the case where it is determined by the determination function that the predetermined condition is satisfied.

Effects of the Invention

The present invention makes it possible to alleviate a sense of strangeness that is given by an avoiding action.

PREFERRED MODE FOR CARRYING OUT THE INVENTION

An embodiment of the present invention will be described below with reference to the drawings.

Overview of the Embodiment

It is an object of this embodiment to alleviate a sense of strangeness that is given by an avoiding action.

For this purpose, in this embodiment, an ally character is caused to execute an avoiding action on the basis of the input of an avoiding operation by a player. Furthermore, in this embodiment, in the case where an avoiding operation by the player has been input, it is determined whether or not a predetermined condition is satisfied. Furthermore, in this embodiment, in the case where it is determined that the predetermined condition is satisfied, an enemy character is caused to execute an action that targets the ally character and that results in a failure (hereinafter referred to as a "special attack").

According to the embodiment described above, in the case where an avoiding action is performed at a timing at which the enemy character is not performing an action constituting an attack that targets the ally character and that may result in a success (hereinafter referred to as a "normal attack"), it is possible to cause the enemy character to execute a special attack in accordance with the avoiding action. This makes it possible to provide the player and viewers of the game with a presentation that looks as if the ally character performed an avoiding action suitably against an attack by the enemy character.

Furthermore, according to this embodiment, with the kind of presentation described above, it is possible to alleviate unnaturalness or a lack of reality resulting from the occurrence of a meaningless avoiding action and to give the player a sense of achievement for successfully avoiding an attack by the enemy.

That is, according to this embodiment, it is possible to achieve the object of alleviating a sense of strangeness that is given by an avoiding action.

[Hardware Configuration]

Figure 1:
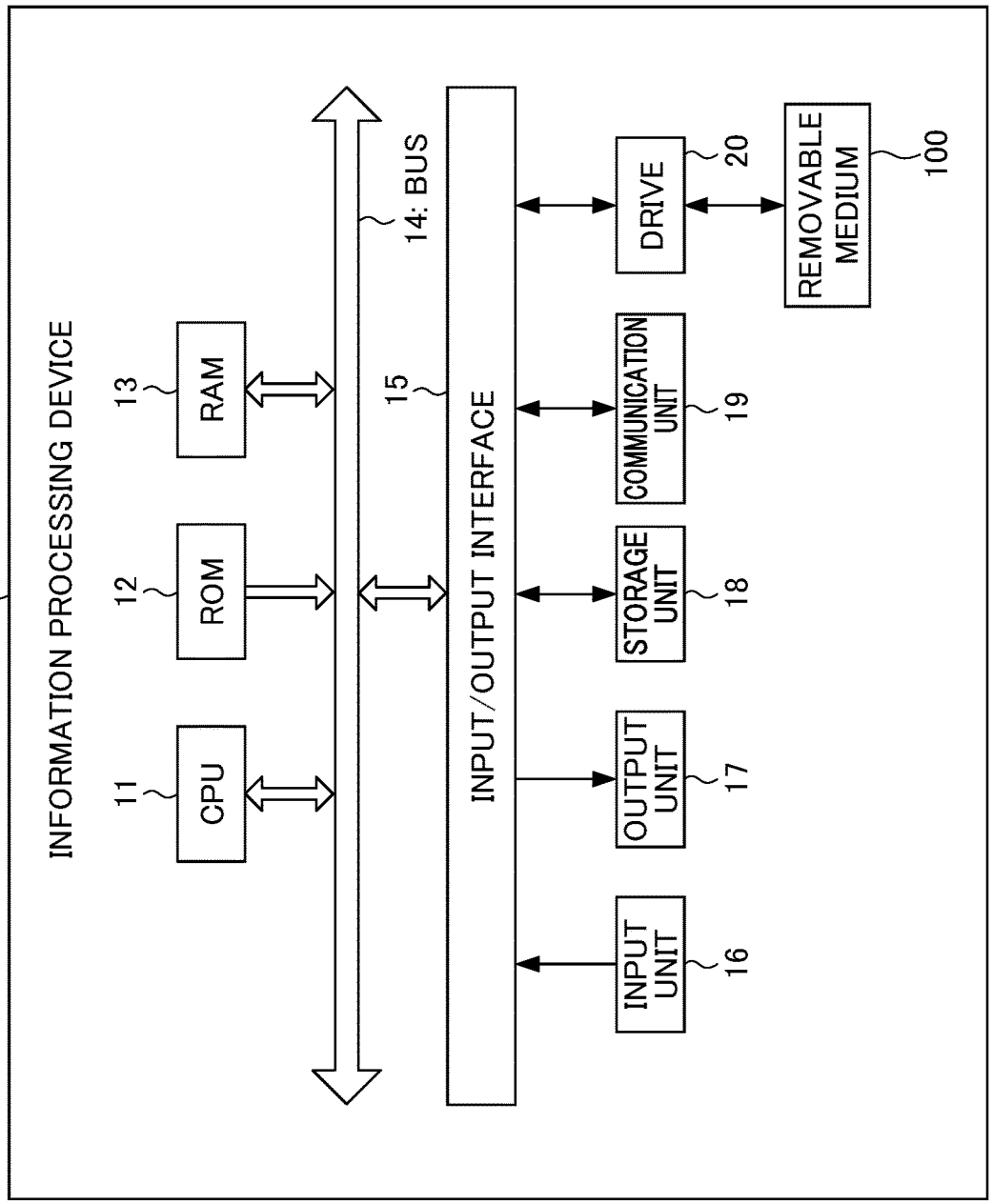
FIG. 1 is a block diagram showing the hardware configuration of an information processing device according to an embodiment of the present invention.

Next, the hardware configuration according to this embodiment will be described with reference to FIG. 1. FIG. 1 is a block diagram showing the hardware configuration of an information processing device 1 according to the embodiment of the present invention.

As shown in FIG. 1, the information processing device 1 includes a CPU (Central Processing Unit) 11, a ROM (Read Only Memory) 12, a RAM (Random Access Memory) 13, a bus 14, an input/output interface 15, an input unit 16, an output unit 17, a storage unit 18, a communication unit 19, and a drive 20.

The CPU 11 executes various kinds of processing according to programs recorded in the ROM 12 or programs loaded from the storage unit 18 into the RAM 13.

The RAM 13 also stores, as appropriate, data, etc. needed for the execution of various kinds of processing by the CPU 11.

The CPU 11, the ROM 12, and the RAM 13 are connected to each other via the bus 14. The input/output interface 15 is also connected to the bus 14. The input unit 16, the output unit 17, the storage unit 18, the communication unit 19, and the drive 20 are connected to the input/output interface 15.

The input unit 16 is formed of various kinds of buttons, direction keys, a touchscreen, a microphone, or the like, and accepts the input of various kinds of information in accordance with instruction operations performed by the administrator of the information processing device 1 or the like. Alternatively, the input unit 16 may be realized by an input device, such as a game controller, a keyboard, or a mouse, that is independent of a main unit accommodating the other units of the information processing device 1.

The output unit 17 outputs image data and sound data to a display, a speaker, etc. The image data and sound data output from the output unit 17 are output from the display, the speaker, etc. in forms recognizable by the player, such as images, music, sound effects, and voice.

The storage unit 18 is formed of a semiconductor memory, such as a DRAM (Dynamic Random Access Memory), and stores various kinds of data.

The communication unit 19 realizes communication that is carried out with other devices. For example, the communication unit 19 carries out communication mutually with a server device (not shown) from which a program for executing a game is downloaded, as well as other information processing devices 1 (not shown). This communication is carried out, for example, via a network such as a LAN (Local Area Network), the Internet, or a mobile phone network, or a network formed by combining these kinds of networks. Furthermore, this communication may be carried out via a relaying device or directly between devices without any intervening relaying device. Note, however, that in this embodiment, the communication unit 19 is not a necessary component and may be omitted from the hardware.

The drive 20 is provided as needed and as appropriate. A removable medium 100 formed of a magnetic disk, an optical disk, a magneto-optical disk, a semiconductor memory, or the like is loaded, as appropriate, in the drive 20. The removable medium 100 stores a program for executing a game and various kinds of data, such as image data. The program and the various kinds of data, such as image data, read by the drive 20 from the removable medium 100, are installed in the storage unit 18, as needed.

The information processing device 1 having the hardware configuration described above can be realized by an electronic appliance having information processing functions, such as an installed game machine, a portable game machine, a personal computer, or a smartphone. Note that in the case where the information processing device 1 is configured as a portable device, the individual hardware units of the information processing device 1 as well as a display and a speaker may be realized in the form of an integrated device.

[Functional Configuration]

Next, the functional configuration of the information processing device 1 will be described with reference to FIG. 2.

Figure 2:
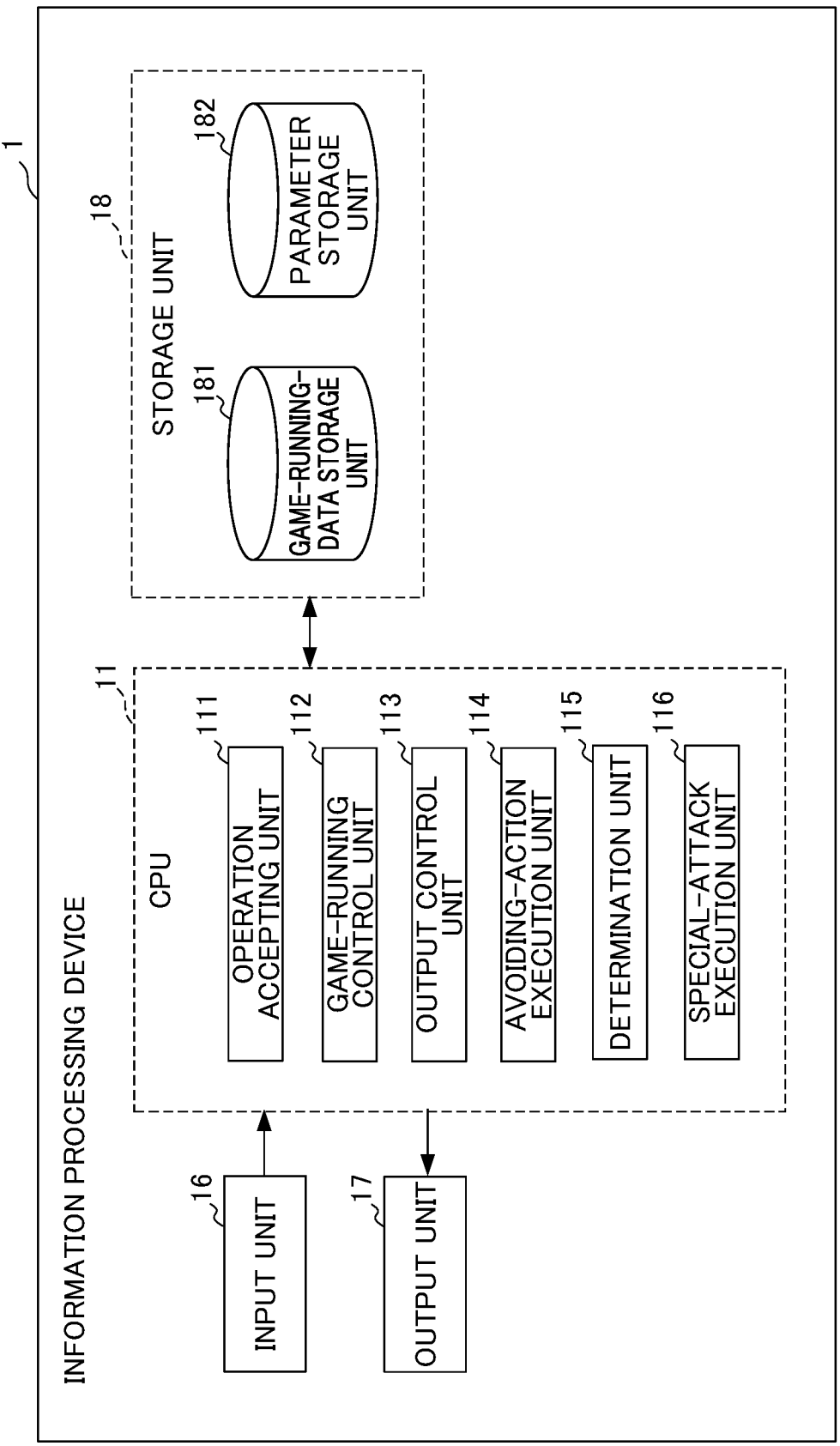
FIG. 2 is a functional block diagram showing the functional configuration for executing a special-attack execution process in the functional configuration of the information processing device shown in FIG. 1.

FIG. 2 is a functional block diagram showing the functional configuration for executing a special-attack execution process in the functional configuration of the information processing device 1 shown in FIG. 1.

Here, the special-attack execution process is a series of processing steps through which an enemy character is caused to execute a special attack, which is an attack that targets an ally character and that results in a failure.

In the case where the special-attack execution process is executed, the CPU 11 functions as an operation accepting unit 111, a game-running control unit 112, an output control unit 113, an avoiding-action execution unit 114, a determination unit 115, and a special-attack execution unit 116, as shown in FIG. 2. These functional blocks execute, as needed and as appropriate, computational processing needed for the execution of the special-attack execution process and information exchange among the functional blocks, as well as the processing described below.

Furthermore, a game-running-data storage unit 181 and a parameter storage unit 182 are set in an area of the storage unit 18.

The operation accepting unit 111 accepts the input of an operation concerning a game by the player via the input unit 16. Furthermore, the operation accepting unit 111 determines the content of the accepted operation input by the player. For example, in the case where the input unit 16 is a controller, the operation accepting unit 111 determines with which button or direction key the operation has been accepted. Alternatively, in the case where the input unit 16 is a touchscreen, the operation accepting unit 111 determines at which coordinates on the touchscreen the operation has been accepted.

Then, the operation accepting unit 111 outputs, as appropriate, the content of the operation input by the player, identified by the determination, to other functional blocks.

The game-running control unit 112 controls how the game runs as a whole by executing processing for running the game. Specifically, the game-running control unit 112 controls how the game runs on the basis of game software stored in the game-running-data storage unit 181, which will be described later, and the content of the player operation input from the operation accepting unit 111. Furthermore, the game-running control unit 112 outputs, as appropriate, the status of progress of the game based on the game running control to other functional blocks.

Furthermore, as how the game runs is controlled, the game-running control unit 112 manages predetermined parameters in the game. Examples of the predetermined parameters include parameters indicating the values of the status of the ally character, such as a level and hit points, parameters indicating items and equipment available for the ally character, and parameters indicating past game results.

These predetermined parameters are stored in the parameter storage unit 182, which will be described later. Furthermore, in the case where processing involving changes in these predetermined parameters (e.g., processing involving increases or decreases in the parameter values or processing that results in changes of flags indicating parameter statuses) occurs in the game, the game-running control unit 112 changes the predetermined parameters on the basis of the results of the processing. For example, in the case where processing involving a successful normal attack on the ally character by the enemy character has occurred, the hit points of the ally character are decreased in accordance with the normal attack.

Furthermore, the game-running control unit 112 updates the predetermined parameters stored in the parameter storage unit 182 on the basis of the predetermined parameters after the changes. Furthermore, the game-running control unit 112 continues to run the game in accordance with the updated predetermined parameters.

It suffices for the game that is run by the game-running control unit 112 to be a game in which an ally character and an enemy character are in opposition to each other therein, and there is no particular limitation to the content of the game. That is, this embodiment is applicable to arbitrary games without limitations concerning the game content, the game genre, etc. In this embodiment, as an example, it is assumed that the game-running control unit 112 runs a game in which an ally character moves on a field, and the ally character and an enemy character present on the field mutually perform attacks.

The output control unit 113 executes control processing for generating an image corresponding to the status of progress of the game on the basis of the status of progress of the game as controlled by the game-running control unit 112 and image data stored in the game-running-data storage unit 181, which will be described later, and causing the display connected to the output unit 17 to display the generated image. That is, the output control unit 113 also functions as a rendering unit that executes processing for rendering characters, etc. as the game is run.

In addition, the output control unit 113 executes processing for generating music, sound effects, voice, etc. for the game from the status of progress of the game as controlled by the game-running control unit 112 and sound data stored in the game-running-data storage unit 181 and causing the speaker connected to the output unit 17 to output the generated sound, etc.

The avoiding-action execution unit 114 causes the ally character to execute an avoiding action in the game. For this purpose, the avoiding-action execution unit 114 monitors the content of player operations input from the operation accepting unit 111. Furthermore, in the case where a player operation for instructing the ally character to execute an avoiding action (hereinafter referred to as an "avoiding operation") is detected and the ally character is not in specific situations such as performing an attack or being damaged, the avoiding-action execution unit 114 outputs an instruction for executing the avoiding action to the individual functional blocks. Accordingly, the game-running control unit 112 controls how the game runs and causes the ally character to execute the avoiding action. Furthermore, incidentally, the output control unit 113 generates an image and sound associated with the avoiding action, which are output from the output unit 17.

Here, there is no limitation as to what kind of operation is considered as an avoiding operation. For example, a predetermined button operation is considered as an avoiding operation.

Alternatively, a combination of a predetermined button operation and an operation of one of the direction keys is considered as an avoiding operation. In this case, the ally character performs an avoiding action in the direction instructed with a direction key. That is, for avoiding actions realized by avoiding operations, there may be just a single mode or a plurality of modes based on combinations with direction keys, etc.

Furthermore, images of the ally character (i.e., the motion of an avoiding action) that are rendered while changing sequentially in time in association with an avoiding action are provided for individual modes of avoiding action. For example, a motion of rolling in the direction instructed with a direction key (e.g., a motion of rolling forward or laterally) may be provided. Without limitation to this motion, however, a plurality of kinds of motion may be provided for each mode of avoiding action. In this case, one of the plurality of kinds of motion is selected and is rendered on the basis of a predetermined condition, such as a positional relationship between the ally character and the enemy character, or at random. By providing a plurality of kinds of motion for each of a plurality of modes, as described above, it is possible to provide the player with presentation including rich variations.

Furthermore, in the case where an avoiding action has been executed, the ally character enters a state in which an attack by the enemy character is not accepted for a predetermined time (hereinafter referred to as an "invincible state"). In order to realize this invincible state, for example, the game-running control unit 112 executes processing while assuming as if a hit determination area, which is an area in which the ally character accepts an attack by the enemy character, were absent for the predetermined time. Alternatively, the game-running control unit 112 executes processing while determining an attack by the enemy character hitting the hit determination area as being invalid during the predetermined time. Accordingly, the ally character is kept in the invincible state for the predetermined period, during which an attack by the enemy character results in a failure.

The determination unit 115 determines whether or not a predetermined condition for causing the enemy character to execute the special attack is satisfied. Various conditions are conceivable as the predetermined condition. Furthermore, the predetermined condition may be either a single condition or a combination of a plurality of conditions.

In this embodiment, as an example, the following three conditions, namely, (Condition 1), (Condition 2), and (Condition 3), constitute the predetermined condition for causing the execution of the special attack.

<Predetermined Condition for Causing the Execution of the Special Attack>

(Condition 1) The ally character executes an avoiding action.

(Condition 2) The avoiding action is executed in a predetermined mode.

(Condition 3) The enemy character is not in specific situations such as performing the normal attack (which may include performing an action that is a sign of the normal attack) or being damaged and is in a state where it is possible to execute the special attack.

Note that there is no particular limitation to the predetermined mode in (Condition 2) mentioned above. In the following, as an example, a mode in which the ally character moves in a direction going away from the enemy character is considered as the predetermined mode. By executing the special attack in the case of the mode in which the ally character moves in the direction going away from the enemy character (i.e., a mode in which the ally character moves in a direction for avoiding an attack by the enemy character), it is possible to realize presentation that looks as if an avoiding action were performed suitably in a more convincing manner. That is, it is possible to further alleviate unnaturalness or a lack of reality resulting from the occurrence of a meaningless avoiding action.

Furthermore, the mode of moving in the direction going away in (Condition 2) mentioned above refers to a mode in which, as a result of movement associated with an avoiding action, the distance between the reference position of the ally character and the reference position of the enemy character becomes longer after the avoiding action than before the avoiding action.

For example, in the case where the ally character and the enemy character squarely face each other, the direction behind the ally character is the direction going away. Thus, the determination unit 115 determines the mode in which the ally character moves in the direction behind itself as a result of movement associated with an avoiding action as the mode of moving in the direction going away. Meanwhile, in the case where the enemy character and the ally character squarely face each other, the direction ahead of the ally character is a direction going nearer, not the direction going away. Thus, the determination unit 115 does not determine the mode in which the ally character moves in the direction ahead of itself in association with an avoiding action as the mode of moving in the direction going away.

Furthermore, in the case where the enemy character and the ally character squarely face each other, the leftward and rightward directions, which are orthogonal to the directions ahead of and behind the ally character (i.e., the forward and backward directions), may be considered as directions going away or not as directions going away. That is, in the case where the ally character moves in the leftward or rightward direction but not in the forward or backward direction as a result of movement associated with an avoiding action, the mode of the avoiding action may be considered not as the mode of moving in the direction going away or as the mode of moving in the direction going away. This choice may be arbitrarily made by the game developer.

Furthermore, as for the reference positions for determining whether or not a mode is the mode of moving in the direction going away, for example, the center position of the ally character is considered as the reference position of the ally character, and the center position of the enemy character is considered as the reference position of the enemy character. Alternatively, for example, while considering the center position of the ally character as the reference position of the ally character, the distal end position of a part for executing an attack by the enemy character (e.g., a part of the enemy character, such as a weapon, an arm, or the tail) may be considered as the reference position of the enemy character. Furthermore, for example, in the case where the game is expressed by using three-dimensional computer graphics, instead of determining whether moving away or not on the basis of the distance along one direction (e.g., the forward or backward direction) or the distances along two orthogonal directions (e.g., the forward or backward direction and the leftward or rightward direction), as described above, the determination unit 115 may be configured to determine whether moving away or not on the basis of all the distances along the three orthogonal directions (the forward or backward direction, the leftward or rightward direction, and the upward or downward direction).

Although the above description has been given in the context of an example where the enemy character and the ally character squarely face each other, also in the case where the enemy character and the ally character do not squarely face each other (e.g., in the case where the ally character is present on a lateral side of the enemy character), similarly to the above description, it is possible to determine whether or not a mode is the mode of moving in the direction going away on the basis of the distance between the reference position of the ally character and the reference position of the enemy character.

The determination unit 115 determines whether or not (Condition 1) mentioned above is satisfied on the basis of whether or not the avoiding-action execution unit 114 has issued an instruction for executing an avoiding action. Furthermore, in the case where (Condition 1) mentioned above is satisfied, the determination unit 115 determines whether or not (Condition 2) mentioned above and (Condition 3) mentioned above are satisfied on the basis of the status of progress of the game, input from the game-running control unit 112. Then, the determination unit 115 outputs the individual results of determination for these three conditions to other functional blocks.

The special-attack execution unit 116 causes the enemy character to execute the special attack in the game. For this purpose, the special-attack execution unit 116 monitors the individual results of determination for the three conditions mentioned above, input from the determination unit 115, and outputs an instruction for executing the special attack to each of the functional blocks in the case where all the three conditions mentioned above are satisfied. Accordingly, the game-running control unit 112 controls how the game runs so as to cause the enemy character to execute the special attack. Furthermore, incidentally, the output control unit 113 generates an image and sound associated with the special attack, which are output from the output unit 17. As described earlier, the special attack is an attack that targets the ally character and that results in a failure. Thus, the special attack fails, so that the ally character is not damaged or otherwise negatively affected in association with the special attack.

Furthermore, images of the enemy character that are rendered while changing sequentially in time in association with the special attack (i.e., the motion of the special attack) may be a motion specialized for the special attack, or may be the same as the motion of the normal attack by the enemy character.

In the case where the same motion as the normal attack motion is used, a portion of the normal attack motion may be omitted so that the special attack is started and is finished during an invincible state in an avoiding action (i.e., so that the special attack will be done in short time). For example, by varying the position for starting motion rendering from that in the case of the normal attack, the beginning portion of the motion (i.e., the preceding sign portion of an attacking action) may be omitted (i.e., cut).

By using the same motion as the normal attack motion, it is possible to reduce various costs compared with the case where a motion specialized for the special attack is used. For example, it is possible to reduce the costs of developing a motion specialized for the special attack by a developer in game development. Furthermore, it is possible to reduce the costs of the amount of data in game software, which is a program for executing a game.

Furthermore, when a motion specialized for the special attack is prepared, it becomes easier for the player to distinctly recognize the normal attack and the special attack. The same motion as the normal attack motion may also be used in the case where the game developer does not intend to make it possible for the player to distinctly recognize the normal attack and the special attack, as described above. In this case, the player cannot distinguish between the normal attack and the special attack. Thus, it is possible to realize the special attack without giving the player a sense of strangeness concerning the rendering of the special attack.

Note that the game-running control unit 112 causes the enemy character to execute the normal attack on the basis of a predetermined algorithm. Accordingly, the output control unit 113 generates an image and sound associated with the normal attack, which are output from the output unit 17. For example, the predetermined algorithm is set so that the normal attack is executed at predetermined intervals or at random. Alternatively, the predetermined algorithm is set so that the normal attack is performed in the case where the positional relationship between the enemy character and the ally character has become a predetermined positional relationship. For example, the predetermined positional relationship is a positional relationship in which the distance between the enemy character and the ally character is not greater than a predetermined distance. In this case, the game-running control unit 112 may be configured to estimate whether or not the predetermined positional relationship will be satisfied on the basis of the status of operation by the player. For example, the game-running control unit 112 may be configured to estimate, in the case where the player is linearly moving the ally character, that the ally character will be moved to a position on the extension of the linear line in a few seconds.

The game-running-data storage unit 181 stores various kinds of data needed for the game-running control unit 112 to run the game. Examples of the various kinds of data for running the game include game software, which is a program for executing the game, as well as image data, music data, and sound data for generating game images and sound. Furthermore, in the case where at least a portion of characters and the background is displayed by using three-dimensional computer graphics in the game, the game-running-data storage unit 181 also stores polygon data, texture information, etc. for realizing presentation based on three-dimensional computer graphics.

The parameter storage unit 182 stores predetermined parameters, as described in the above description of the game-running control unit 112.

Note that although these various kinds of data for running the game may be stored only in the game-running-data storage unit 181 of the storage unit 18, the data may be read by the drive 20 from the removable medium 100, as appropriate. Alternatively, these various kinds of data may be transmitted to the information processing device 1, as appropriate, by way of communication via the communication unit 19 from a server device (not shown) or other information processing devices 1 (not shown). That is, these various kinds of data may be downloaded, as needed and as appropriate, when the game is installed or when the game is updated.

The special-attack execution process is executed through cooperation among the functional blocks described above.

[Relationships Between Attacks by the Enemy Character and the Avoiding Action]

Next, the relationships between attacks by the enemy character and avoiding actions will be described with reference to FIG. 3.

Figure 3:
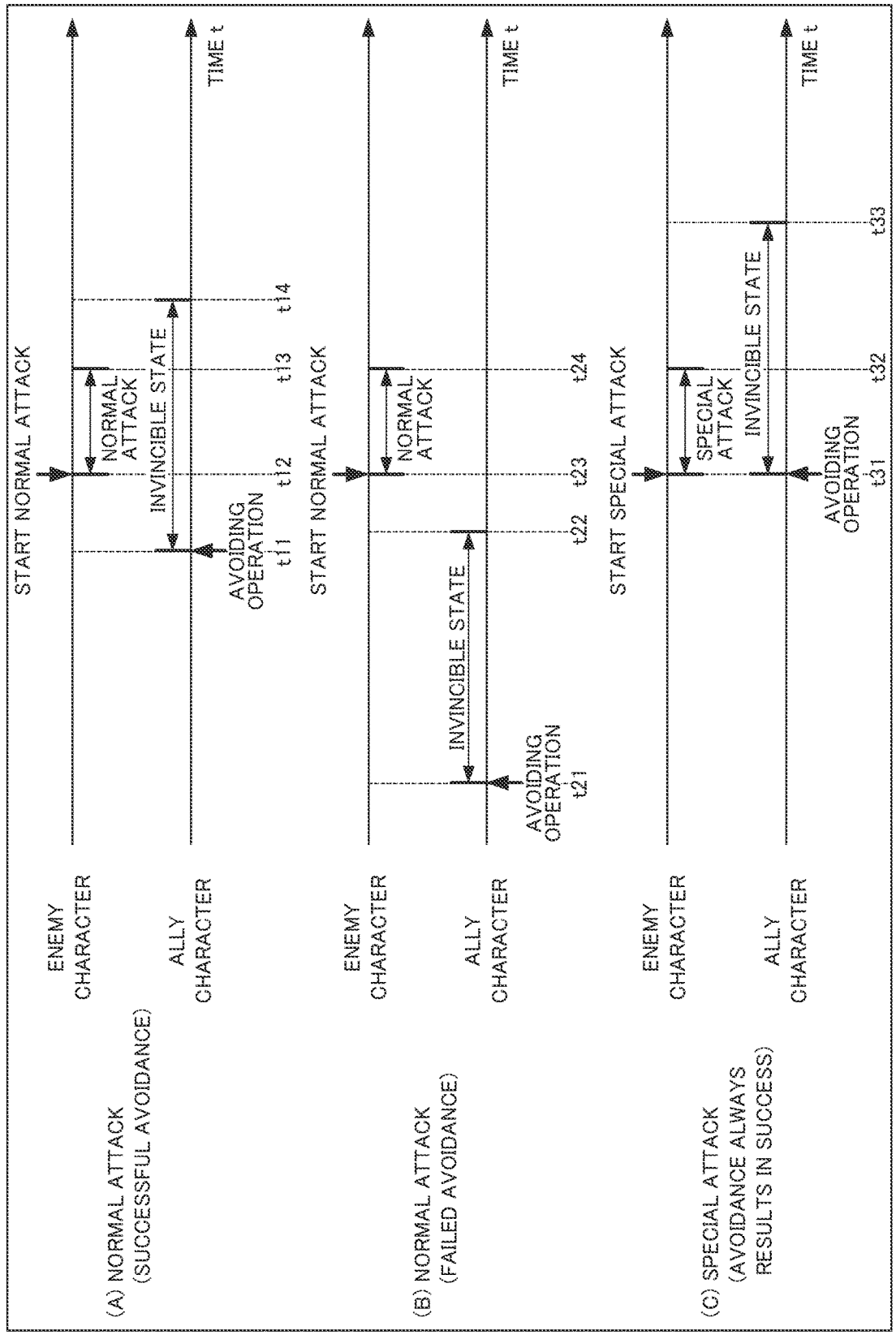
FIG. 3 is a timing chart showing the relationships between attacks (including both a normal attack and a special attack) by an enemy character and avoiding actions according to the embodiment of the present invention.

FIG. 3 is a timing chart showing the relationships between attacks (including both the normal attack and the special attack) by the enemy character and avoiding actions.

First, part (A) in FIG. 3 shows an example of the case where the enemy character performs a normal attack and the normal attack is avoided by performing an avoiding action. Suppose that the player anticipates a normal attack by the enemy character and performs an avoiding operation at time t11. In this case, an avoiding action by the ally character is executed through cooperation among the functional blocks, as described earlier, whereby the ally character enters the invincible state during a certain time (corresponding to the time up to time t14). When the normal attack by the enemy character is started (corresponding to time t12) while the invincible state is being continued, as anticipated by the player, and the normal attack is finished (corresponding to time t13), the avoidance by the ally character results in a success. Thus, the normal attack by the enemy character results in a failure, so that the ally character is not damaged or otherwise negatively affected. Note that in this case, in the case where the mode of the avoiding action by the ally character is the mode of moving in the direction going away and (Condition 3) given earlier is satisfied at time t11, the enemy character executes a special attack instead of a normal attack, as will be described later with reference to part (C) in FIG. 3.

Meanwhile, part (B) in FIG. 3 shows an example of the case where the enemy character performs a normal attack and the normal attack is not successfully avoided by an avoiding action. Suppose that the player anticipates a normal attack by the enemy character and performs an avoiding operation at time t21. In this case, an avoiding action by the ally character is executed through cooperation among the functional blocks, as described earlier, whereby the ally character enters the invincible state during a certain time (corresponding to the time up to time t22). When a normal attack by the enemy character is not performed while the invincible state is being continued, contrary to the anticipation by the player, a normal attack is started after the invincible state comes to an end (corresponding to time t23), and the normal attack is finished (corresponding to time t24), the avoidance by the ally character results in a failure.

Thus, the normal attack by the enemy character results in a success, so that the ally character is damaged or otherwise negatively affected in association with the normal attack. For example, the ally character is damaged in such a manner that the hit points are decreased or movement is prohibited for a certain time.

Note that the avoidance by the ally character results in a failure also in the case where an avoiding action is started in the middle of a normal attack and in the case where an avoiding action is finished in the middle of a normal attack, as well as the case where an avoiding action is finished before a normal attack, as shown in part (B) in FIG. 3. However, even in the case where an avoiding action is started in the middle of a normal attack, the avoidance by the avoiding action results in a success in the case where the avoiding action is started before the normal attack hits the hit determination area of the ally character.

As another case, in the case where an avoiding operation is performed after a normal attack is finished, the normal attack by the enemy character results in a success. In this case, the ally character is being damaged, so that an avoiding action associated with the avoiding operation is not executed.

In this embodiment, it is possible to realize a normal attack, which is an attack that may result in a success (i.e., an attack that may be avoided), as shown in parts (A) and (B) in FIG. 3.

Meanwhile, part (C) in FIG. 3 shows an example of the case where the enemy character performs a special attack. Here, since the special attack is an attack that results in a failure, avoidance always succeeds. Suppose that the player anticipates a normal attack by the enemy character and performs an avoiding operation for moving in the direction going away at time t31. In this case, an avoiding action by the ally character is executed through cooperation among the functional blocks, as described above, whereby the ally character enters the invincible state for a predetermined time (corresponding to the time up to time t33). Although a normal attack is not performed in this situation contrary to the anticipation by the player, if (Condition 3) given earlier is satisfied at time t33, when a special attack is started instead of a normal attack while the invincible state is being continued (corresponding to time t31), and the special attack is finished (corresponding to time t32), the avoidance by the ally character results in a success.

Thus, the special attack by the enemy character results in a failure, so that the ally character is not damaged or otherwise negatively affected. In this embodiment, a special attack is started and is finished while the invincible state associated with an avoiding action is being continued, as shown in part (C) in FIG. 3. This makes it possible to realize a special attack, which is an attack that results in a failure. Note that although a special attack is started at the same timing as the timing of accepting an avoiding operation and starting an avoiding action at time t31 in part (C) in FIG. 3, a special attack may be started at a timing later than time t31 if the special attack is finished before time t33.

[Operation]

Figure 4:
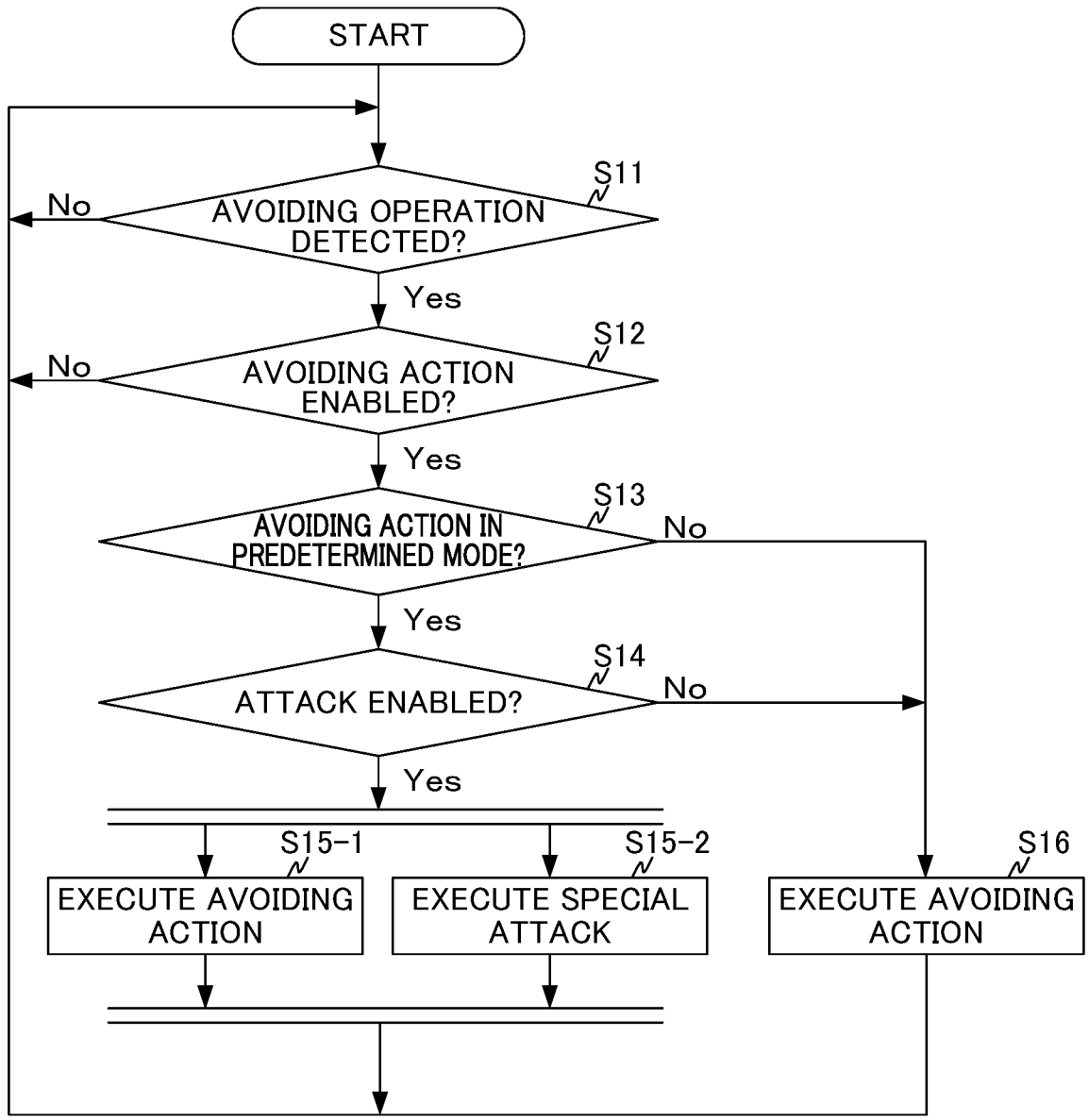
FIG. 4 is a sequence chart for explaining the flow of the special-attack execution process executed by the information processing device in FIG. 1, which has the functional configuration in FIG. 2.

Next, the operation in the special-attack execution process that is executed by the information processing device 1 will be described with reference to FIG. 4. FIG. 4 is a sequence chart for explaining the flow of the special-attack execution process.

The special-attack execution process is executed in the case where a situation in which the ally character and the enemy character that are in opposition to each other mutually perform attacks occurs in the game.

In step S11, the avoiding-action execution unit 114 monitors the content of a player operation input from the operation accepting unit 111 and determines whether or not an avoiding operation has been detected. In the case where an avoiding operation has been detected, the determination in step S11 results in Yes, and the process proceeds to step S12. Meanwhile, in the case where an avoiding operation has not been detected, the determination in step S11 results in No, and the determination in step S11 is repeated in the process.

In step S12, the avoiding-action execution unit 114 determines whether or not the ally character is in a state other than specific situations such as performing an attack or being damaged and is in a state where it is possible to execute an avoiding action. In the case where the ally character is in a state where it is possible to execute an avoiding action, the determination in step S12 results in Yes, and the process proceeds to step S13. Meanwhile, in the case where the ally character is not in a state where it is possible to execute an avoiding action, the determination in step S12 results in No, and the process returns to step S11, and the processing described above is repeated.

In step S13, on the basis of the avoiding operation detected in step S11, the determination unit 115 determines whether or not the mode of an avoiding action to be executed is a predetermined mode (here, the mode in which the ally character moves in the direction going away from the enemy character). In the case where the mode of the avoiding action is the predetermined mode, the determination in step S13 results in Yes, and the process proceeds to step S14. Meanwhile, in the case where the mode of the avoiding action is not the predetermined mode, the determination in step S13 results in No, and the process proceeds to step S16.

In step S14, the determination unit 115 determines whether or not the enemy character is in a situation other than specific situations such as performing a normal attack (which may include an action that is a sign of a normal attack) or being damaged and is in a state where it is possible to execute a special attack. In the case where the enemy character is in a state where it is possible to execute a special attack, the determination in step S14 results in Yes, and the process proceeds to steps S15-1 and S15-2. Meanwhile, in the case where the enemy character is not in a state where it is possible to execute a special attack, the determination in step S14 results in No, and the process proceeds to step S16.

Steps S15-1 and S15-2 are executed concurrently, as described earlier with reference to part (C) in FIG. 3. In the figure, double lines indicating that these processing steps are executed concurrently are shown. Specifically, in step S15-1, the avoiding-action execution unit 114 causes the ally character to execute an avoiding action. Furthermore, in step S15-2, the special-attack execution unit 116 causes the enemy character to execute a special action. This makes it possible to realize a special attack, which is an attack that results in a failure. Then, the process returns to step S11, and the processing described above is repeated.

In step S16, the avoiding-action execution unit 114 causes the ally character to execute an avoiding action. In this case, as described earlier with reference to parts (A) and (B) in FIG. 3, the avoiding action results in a success or a failure depending on the timing at which a normal attack by the enemy character is executed. Then, the process returns to step S11, and the processing described above is repeated.

As described above, the special-attack execution process is repeated while a situation in which the ally character and the enemy character that are in opposition to each other mutually perform attacks is being continued in the game. Then, the special-attack execution process is terminated in the case where the situation in which attacks are mutually performed has come to an end.

EXAMPLES OF PRESENTATION

Figure 5:
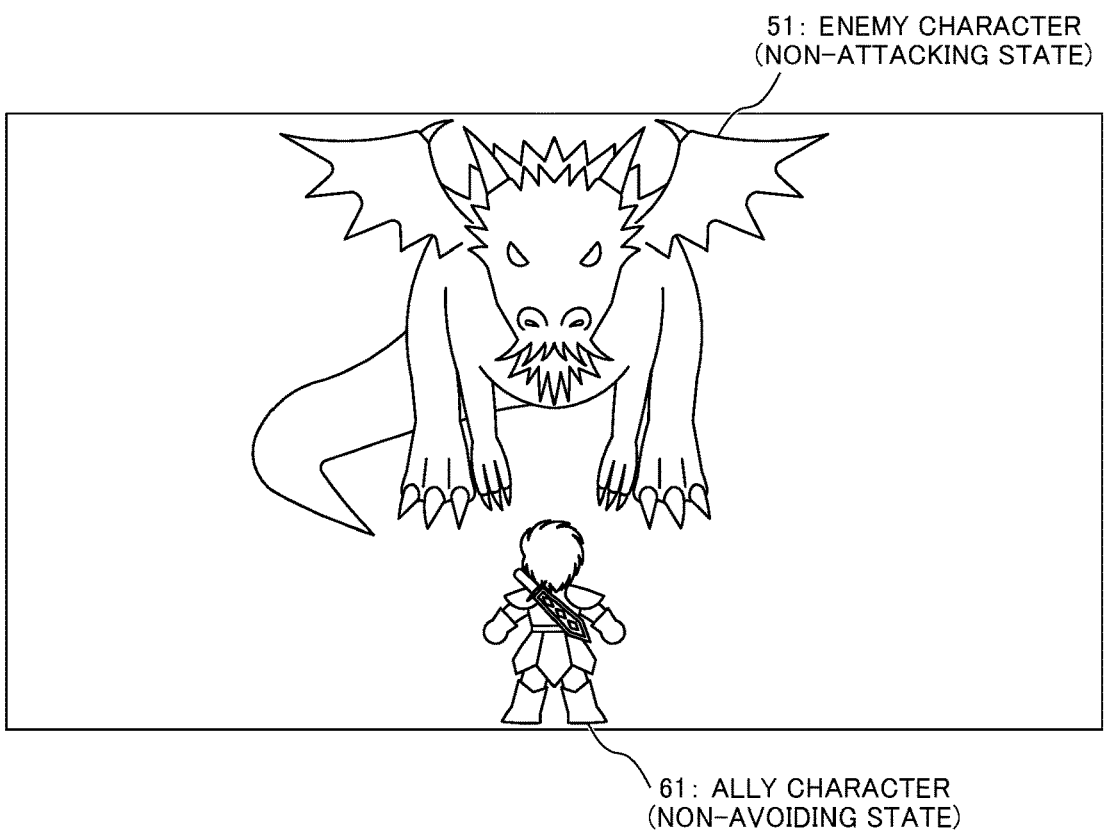
FIG. 5 is a schematic illustration showing a state before a special attack is performed as an example of a difference in display depending on whether or not a special attack is being performed.
Figure 6:
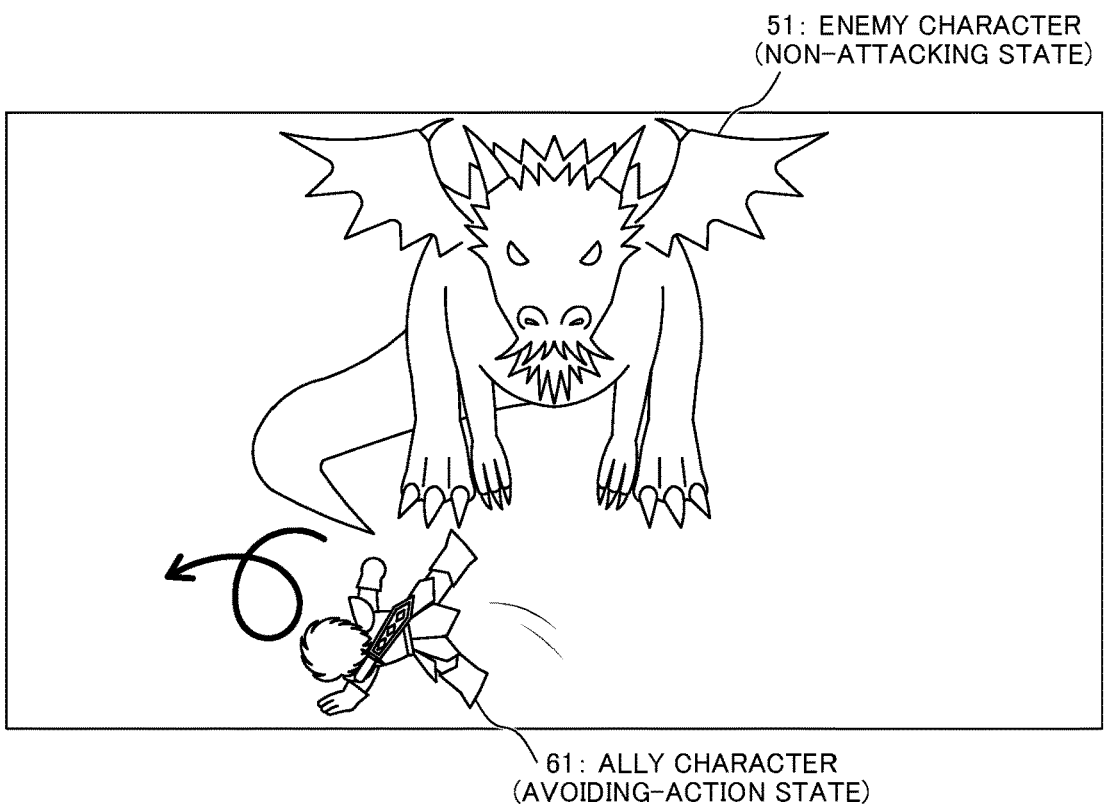
FIG. 6 is a schematic illustration showing a state in which a special attack is not being performed as an example of a difference in display depending on whether or not a special attack is being performed.
Figure 7:
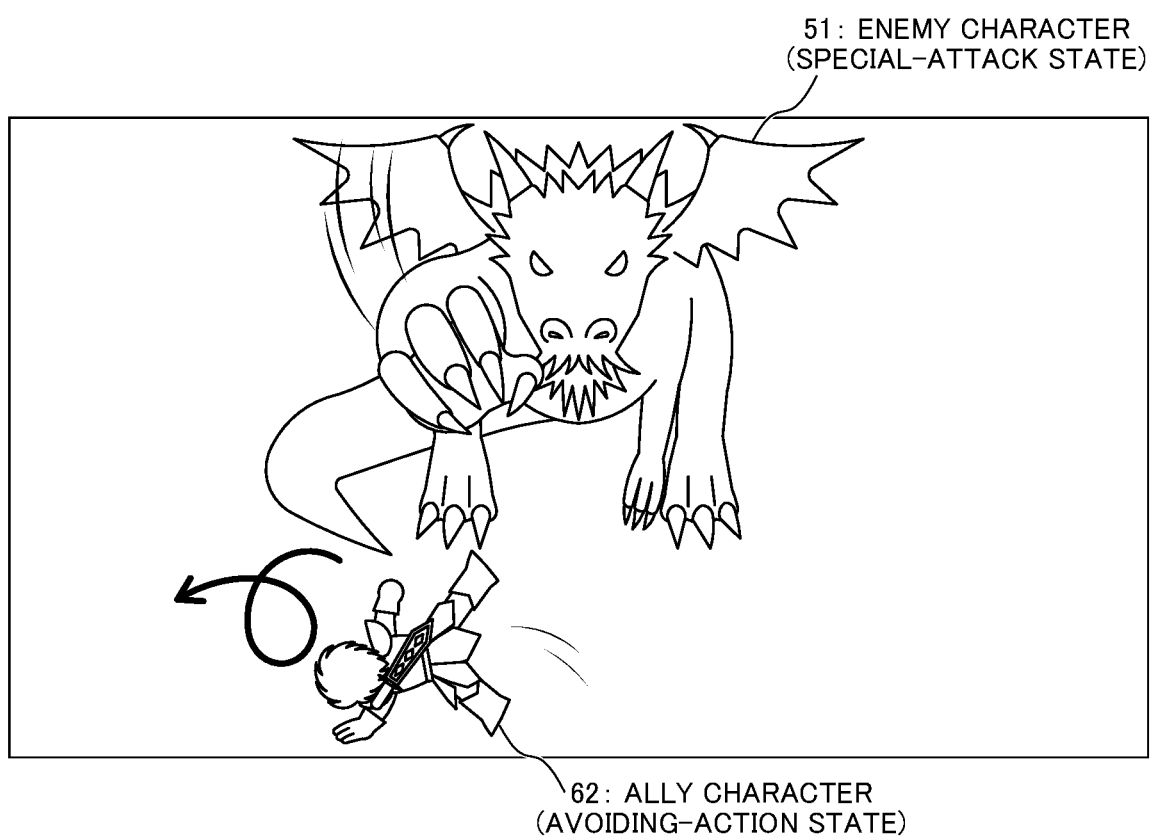
FIG. 7 is a schematic illustration showing a state in which a special attack is being performed as an example of a difference in display depending on whether or not a special attack is being performed.

Differences in presentation in relation to whether or not a special attack is being performed through the execution of the special-attack execution process, described above, will be described with reference to FIGS. 5, 6, and 7. FIGS. 5, 6, and 7 are schematic illustrations showing an example of differences in presentation in relation to whether or not a special attack is being performed.

FIG. 5 shows an example of presentation in the case where an ally character 61 and an enemy character 51 are in opposition to each other. In the situation shown in FIG. 5, the enemy character 51 is in a state where neither a normal attack nor a special attack is being performed (denoted as a "non-attacking state" in the figure). Furthermore, the ally character 61 is in a state where neither an attack nor an avoiding action is being performed (denoted as a "non-avoiding state" in the figure). Suppose that an avoiding operation is performed in this situation even though the action of a normal attack is not performed by the enemy character 51.

Here, FIG. 6 shows an example of presentation that is given by using existing technology instead of an example of presentation that is given in the case where a special attack is performed as in the embodiment describe above. As shown in FIG. 6, with existing technology, since a special attack is not performed, even though the enemy character 51 is in a state where neither a normal attack nor a special attack is being performed, the ally character 61 enters a state in which an avoiding action has been executed (denoted as an "avoiding-action state" in the figure). In the case where presentation is performed with such existing technology, the ally character 61 results in performing an avoiding action irrespective of whether an attack by the enemy character 51 is performed, as described above. This gives the player and viewers of the game a sense of strangeness, such as unnaturalness or a lack of reality. In particular, when such avoiding actions are performed successively, an even greater sense of strangeness results.

Meanwhile, FIG. 7 shows an example of presentation that is given in the case where a special attack is performed as in the embodiment described above. As shown in FIG. 7, in this embodiment, in the case where the ally character 61 enters a state in which an avoiding action has been executed (denoted as an "avoiding-action state" in the figure), the enemy character 51 enters a state where a special attack has been executed (denoted as a "special-attack state" in the figure). Thus, it is possible to provide the player and viewers of the game with presentation that looks as if the ally character 61 performed an avoiding action suitably against an attack by the enemy character 51.

Furthermore, according to this embodiment, with the kind of presentation described above, it is possible to alleviate unnaturalness or a lack of reality resulting from the occurrence of a meaningless avoiding action and to give the player a sense of achievement for successfully avoiding an attack by the enemy.

[Modifications]

Although the embodiment of the present invention has been described above, the embodiment is merely an example and does not limit the technical scope of the present invention. The present invention can be embodied in various other forms, and it is possible to make various modifications, such as omission and substitution, without departing from the spirit of the present invention. These embodiments and modifications thereof are encompassed in the scope and spirit of the invention disclosed in this description, etc. and are encompassed in the scope of the invention recited in the claims and equivalents thereof.

For example, the embodiment of the present invention may be modified as in the following modifications. Furthermore, the following modifications may be combined with each other.

<First Modification>

In the embodiment described above, a special attack, which is an attack that targets the ally character and that results in a failure, is realized by utilizing the invincible state, which occurs in association with an avoiding action, as described earlier with reference to part (C) in FIG. 3. Without limitation thereto, however, a special attack may be realized in other manners. For example, a special attack may be realized by utilizing the positional relationship between the enemy character and the ally character.

In this case, the special-attack execution unit 116 causes the enemy character to perform, as a special attack, a special attack that is performed in a positional relationship in which the special attack does not hit the hit determination area of the ally character, such as a special attack with which the attack range is smaller compared with a normal attack or a special attack with which the attack range is oriented in a direction different from the hit determination area of the ally character. Accordingly, the special attack does not hit the hit determination area and thus results in a failure.

That is, also with this modification, it is possible to realize a special attack, which is an attack that results in a failure. Furthermore, with this modification, it is possible to cause the execution of a special attack without considering whether or not the ally character is in the invincible state. Thus, for example, it becomes possible to use a motion that takes a time longer than the duration of the invincible state as a special attack motion.

<Second Modification>

A special attack may be realized by utilizing the positional relationship between the enemy character and the ally character in another way different from that in the first modification described above.

In this case, the special-attack execution unit 116 adds (Condition 4) given below in addition to (Condition 1), (Condition 2), and (Condition 3) given earlier as the predetermined condition for causing the enemy character to execute a special attack.

(Condition 4) The enemy character and the ally character are in a positional relationship in which a special attack by the enemy character does not hit the hit determination area of the ally character.

That is, (Condition 4) given above is satisfied in the case where the enemy character and the ally character are so distant from each other that a special attack does not hit. In the case where (Condition 4) is satisfied, a special attack does not hit the hit determination area and thus results in a failure. That is, also with this modification, it is possible to realize a special attack, which is an attack that results in a failure. Furthermore, with this modification, it is possible to cause the execution of a special attack without considering whether or not the ally character is in the invincible state. Thus, for example, it becomes possible to use a motion that takes a time longer than the duration of the invincible state as a special attack motion.

In order to realize this modification described above, the determination unit 115 determines whether or not (Condition 4) given above is also realized, for example, at a timing before or after step S13 or step S14 in FIG. 4. In the case where (Condition 4) given above is satisfied in addition to (Condition 1), (Condition 2), and (Condition 3) given earlier, processing in steps S15-1 and S15-2 is executed. Meanwhile, in the case where (Condition 4) given above is not satisfied, processing in step S16 is executed. This makes it possible to realize this modification.

Note that there is a possibility of giving the player and viewers of the game a sense of strangeness, such as unnaturalness or a lack of reality, in the case where the enemy character performs a special attack even though the enemy character and the ally character are so distant from each other. Thus, this modification may be further modified to add (Condition 5) given below to (Condition 1), (Condition 2), (Condition 3), and (Condition 4) given above.

(Condition 5) The enemy character and the ally character are in a positional relationship in which the enemy character and the ally character are not separated by not less than a predetermined distance.

The predetermined distance in (Condition 5) given above is set to be such a distance that the player and viewers of the game will not be given a sense of strangeness in the case where the enemy character performs a special attack. This makes it possible to alleviate unnaturalness or a lack of reality concerning a special attack.

In order to realize this further modification of the present modification, the determination unit 115 determines whether or not both (Condition 4) given above and (Condition 5) given above are also satisfied, for example, at a timing before or after step S13 or step S14 in FIG. 4. In the case where (Condition 4) given above and (Condition 5) given above are satisfied in addition to (Condition 1), (Condition 2), and (Condition 3) given earlier, the processing in steps S15-1 and S15-2 is executed. Meanwhile, in the case where (Condition 4) given above or (Condition 5) given above is not satisfied, the processing in step S16 is executed. This makes it possible to realize a further modification of the present modification.

<Third Modification>

In the embodiment described above, three conditions, namely, (Condition 1), (Condition 2), and (Condition 3) given earlier, are used as the predetermined condition for causing the enemy character to execute a special attack. Furthermore, in the case where (Condition 1), (Condition 2), and (Condition 3) given earlier are satisfied, a special attack, which is an attack that targets the ally character and that results in a failure, is realized by utilizing an invincible state that occurs in association with an avoiding action, as described earlier with reference to part (C) in FIG. 3. Without limitation thereto, however, other conditions may further be used in the case where an invincible state that occurs in association with an avoiding action is utilized as in the embodiment described above.

For example, (Condition 5) given above may be added to (Condition 1), (Condition 2), and (Condition 3) given earlier, similarly to the second modification described above. This is because even in the case where an invincible state that occurs in association with an avoiding action is utilized, there is a possibility of giving the player and viewers of the game a sense of strangeness, such as unnaturalness or a lack of reality, in the case where the enemy character performs a special attack even though the enemy character and the ally character are so distant from each other.

Thus, as the predetermined condition for causing the execution of a special attack, as described above, (Condition 5) given above is further used. This makes it possible to alleviate unnaturalness or a lack of reality concerning a special attack even in the case where an invincible state that occurs in association with an avoiding action is utilized.

In order to realize this modification described above, the determination unit 115 determines whether or not (Condition 5) given above is also satisfied, for example, at a timing before or after step S13 or step S14 in FIG. 4. In the case where (Condition 5) given above is satisfied in addition to (Condition 1), (Condition 2), and (Condition 3) given earlier, the processing in steps S15-1 and S15-2 is executed. Meanwhile, in the case where (Condition 5) given above is not satisfied, the processing in step S16 is executed. This makes it possible to realize this modification.

<Fourth Modification>

In the embodiment described above, the case where the ally character and the enemy character are in one-to-one opposition to each other is assumed. Without limitation thereto, however, the relationship between ally characters and enemy characters in opposition to each other may be any of one to many, many to one, and many to many. In this case, the individual characters may be characters individually operated by a plurality of players. That is, the embodiment described above may be applied to a multi-play game. Furthermore, some of the characters may be NPCs (Non Player Characters).

In the case where a plurality of enemy characters exist, all the enemy characters may perform a special attack in the case where the ally character performs an avoiding action, or only enemy characters in a positional relationship in which the distance from the ally character performing the avoiding action is not greater than a predetermined distance may perform a special attack. Furthermore, in the case where a plurality of ally characters exist, a special attack may be an attack that results in a failure with all the characters, or an attack that results in a failure only with ally characters performing avoiding actions and that may result in a success with the other ally characters.

<Fifth Modification>

In the embodiment described above, it is assumed that the functional blocks for executing the special-attack execution process are realized with a single device, namely, the information processing device 1. Without limitation thereto, however, the functional blocks for executing the special-attack execution process may be realized through cooperation among a plurality of devices. For example, some of the functional blocks for executing the special-attack execution process, realized with the information processing device 1, may be distributed to a server device, whereby the functional blocks are realized in the form of a client-server system. In this case, the server device may be a single server device or a combination of a plurality of server devices such as cloud servers.

<Other Modifications>

The embodiment of the present invention and some modifications have been described above. Note, however, that the present invention is not limited to the embodiment and some modifications described above and that the present invention encompasses modifications, improvements, etc. within a scope in which it is possible to achieve the object of the present invention.

Furthermore, the series of processing steps described above can be executed by hardware or by software.

In other words, the functional configuration shown in FIG. 2 is merely an example, and there is no particular limitation thereto. That is, it suffices to provide the information processing device 1 with functions that make it possible to execute the series of processing steps described above as a whole, and the choice of specific functional blocks for realizing those functions is not particularly limited to that in the example in FIG. 2.

Furthermore, each functional block may be implemented by hardware alone, by software alone, or by a combination of hardware and software.

The functional configuration in the embodiment is realized by using a processor that executes computational processing. Processors that can be used in the embodiment include a processor constituted of only one information processing device of various kinds, such as a single processor, a multiprocessor, or a multicore processor, as well as a combination of one of these various kinds of processing devices and a processing circuit such as an ASIC (Application Specific Integrated Circuit) or an FPGA (Field-Programmable Gate Array).

In the case where the series of processing steps is executed by software, a program constituting the software is installed in a computer or the like from a network or a recording medium.

The computer may be a computer embedded in special hardware. Alternatively, the computer may be a computer that is capable of executing various functions when various programs are installed therein, such as a general-purpose personal computer.

A recording medium including such a program is implemented by the removable medium 100 in FIG. 1, which is distributed separately from the main unit of a device in order to provide a player with the program, or is implemented by a recording medium or the like that is provided to a player in a state embedded in advance in the main unit of a device. The removable medium 100 is implemented, for example, by a magnetic disk (including a floppy disk), an optical disk, or a magneto-optical disk. The optical disk is implemented, for example, by a CD-ROM (Compact Disk-Read Only Memory), a DVD (Digital Versatile Disk), or a Blu-ray (registered trademark) disc. The magneto-optical disk is implemented, for example, by an MD (Mini-Disk). Furthermore, the recording medium that is provided to a player in a state embedded in advance in the main unit of a device is implemented, for example, by the ROM 12 in FIG. 1, in which a program is recorded, or a semiconductor memory included in the storage unit 18 in FIG. 1.

Note that, in this description, steps defining the program recorded in the recording medium may include processing that is not necessarily executed sequentially but is executed in parallel or individually, as well as processing that is executed sequentially in order. Furthermore, steps that are executed according to the program recorded in the recording medium may be executed in an arbitrary order within a scope not departing from the spirit of the present invention.

EXPLANATION OF REFERENCE NUMERALS

1 Information processing device
11 CPU
12 ROM
13 RAM
14 Bus
15 Input/output interface
16 Input unit
17 Output unit
18 Storage unit
19 Communication unit
20 Drive
100 Removable medium
111 Game control unit
112 Game-running control unit
113 Output control unit
114 Avoiding-action execution unit
115 Determination unit
116 Special-attack execution unit
181 Game-running-data storage unit
182 Parameter storage unit

The invention claimed is:

1. A non-transitory computer readable medium storing an information processing program that, when executed by a computer, performs a method comprising:
    causing a first character to execute an avoiding action based on an input of an avoiding operation by a player;
    determining a positional relationship between the first character and a second character;
    determining whether a predetermined condition is satisfied based on the avoiding operation and the positional relationship between the first character and the second character,
        wherein the predetermined condition corresponds to the second character performing a first attack that is not a normal attack,
        wherein the first attack has a first attack range that is smaller than a second attack range of the normal attack,
        wherein the normal attack is an attack against the first character that can be successful based on the second attack range and the positional relationship, and
        wherein the first attack can be successful based on the first attack range and the positional relationship; and
    causing the second character to execute a special attack, the special attack being a performance attack that targets the first character and that results in a failure, wherein the special attack is executed in response to determining that the predetermined condition is satisfied.

2. The non-transitory computer readable medium according to claim 1, wherein the method further comprises:
    causing the first character to enter a state in which an attack by the second character results in a failure when the avoiding action is executed, and
    wherein the special attack is an attack that is executed while the state in which an attack by the second character results in a failure is being continued.

3. The non-transitory computer readable medium according to claim 1,
    wherein the special attack is an attack that is executed in a positional relationship in which the special attack by the second character does not hit the first character.

4. The non-transitory computer readable medium according to claim 1, wherein the method further comprises:
    executing control so that image presentation associated with the execution of the avoiding action, and image presentation associated with the execution of the special attack are displayed simultaneously on a display medium.

5. The non-transitory computer readable medium according to claim 4, wherein the method further comprises:
    executing control so that, as the image presentation associated with the execution of the special attack, image presentation in which image presentation of the normal attack is partially omitted is displayed on the display medium.

6. The non-transitory computer readable medium according to claim 1, wherein the method further comprises:
    selecting a mode from a plurality of modes among a plurality of avoiding actions; and
    causing the execution of the selected mode of avoiding action,
    wherein the predetermined condition corresponds to a condition based on a predetermined mode of avoiding action that is selected from among the plurality of modes of the plurality of avoiding actions; and
    causing the execution of the predetermined mode of avoiding action.

7. The non-transitory computer readable medium according to claim 6, wherein the method further comprises:
    determining, based on the predetermined mode of avoiding action, a mode of avoiding action in which the first character moves in a direction away from the second character as a result of the execution of the avoiding action by the first character.

8. The non-transitory computer readable medium according to claim 1, wherein:
determining, based on the predetermined condition, a condition that the second character is in a state in which an attack is enabled in response to the first character executes the avoiding action.

9. An information processing method that is executed by a computer, the information processing method comprising:
causing a first character to execute an avoiding action based on an input of an avoiding operation by a player;
determining a positional relationship between the first character and a second character;
determining whether a predetermined condition is satisfied based on an the avoiding operation and the positional relationship between the first character and the second character,
wherein the predetermined condition corresponds to the second character performing a first attack that is not a normal attack,
wherein the first attack has a first attack range that is smaller than a second attack range of the normal attack,
wherein the normal attack is an attack against the first character that can be successful based on the second attack range and the positional relationship, and
wherein the first attack can be successful based on the first attack range and the positional relationship; and
causing the second character to execute a special attack, the special attack being a performance attack that targets the first character and that results in a failure, wherein the special attack is executed in response to determining that the predetermined condition is satisfied.

10. An information processing device comprising:
a processor; and
a memory connected to the processor, wherein the memory comprises a program configured to perform a method comprising:
causing a first character to execute an avoiding action based on an input of an avoiding operation by a player;
determining a positional relationship between the first character and a second character;
determining whether a predetermined condition is satisfied based on the avoiding operation and the positional relationship between the first character and the second character,
wherein the predetermined condition corresponds to the second character performing a first attack that is not a normal attack,
wherein the first attack has a first attack range that is smaller than a second attack range of the normal attack,
wherein the normal attack is an attack against the first character that can be successful based on the second attack range and the positional relationship, and
wherein the first attack can be successful based on the first attack range and the positional relationship; and
causing the second character to execute a special attack, the special attack being a performance attack that targets the first character and that results in a failure, wherein the special attack is executed in response to determining that the predetermined condition is satisfied.

* * * * *